Dec. 6, 1927.
F. W. GERKEN
HEADLIGHT SHIELD
Filed Sept. 8, 1926
1,651,763
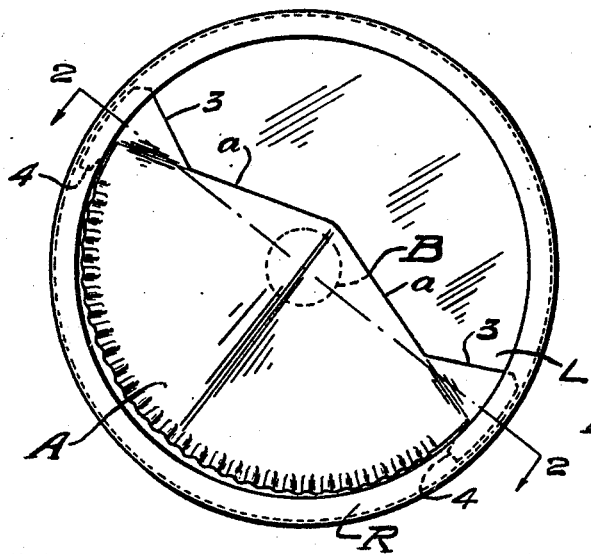
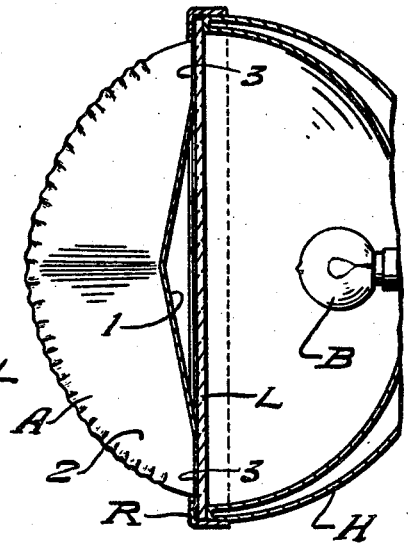
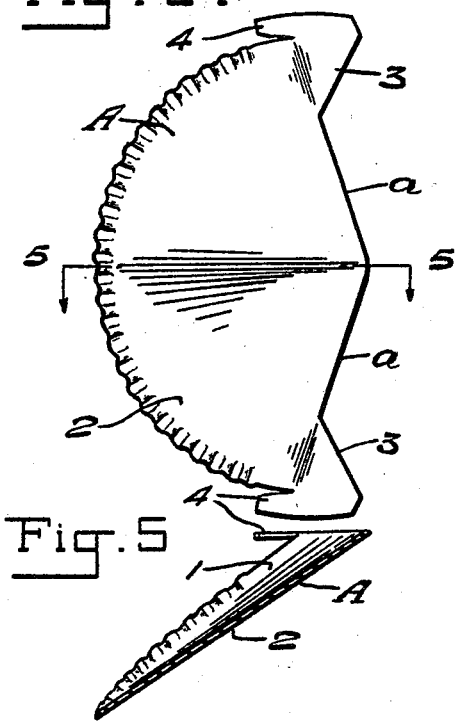
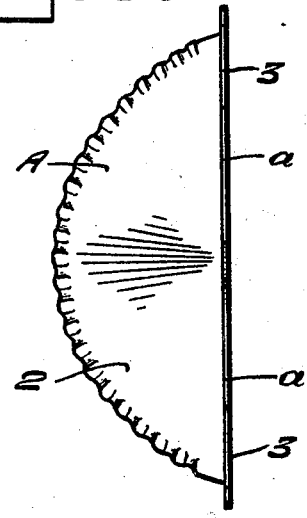
Inventor
Fred W. Gerken
By Watson E. Coleman
Attorney Patented Dec. 6, 1927.

1,651,763

UNITED STATES PATENT OFFICE.

FRED W. GERKEN, OF MITCHELL, SOUTH DAKOTA.

HEADLIGHT SHIELD.

Application filed September 8, 1926. Serial No. 134,205.

This invention relates to a headlight shield and it is an object of the invention to provide a device of this kind adapted to be applied over the lower left hand portion of the lens of a headlight and the bulb so that the rays emitted from the headlight are disposed only to the driver's side of the road and in a manner whereby the driver is enabled to have clear vision of the road straight ahead and also to the right side of the road.

Another object of the invention is to provide a shield of this kind formed of opaque material and formed to constitute a visor when in applied position, said shield being in excess of the quadrant and having its inner surface constituting a reflector to radiate back the light rays projected thereon from the headlight proper causing the light rays emitted from the headlight to issue in a more even beam.

The invention consists in the details of construction and in the combination and arrangement of the several parts of my improved headlight shield whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in front elevation illustrating a shield constructed in accordance with an embodiment of my invention in applied position;

Figure 2 is a sectional view taken substantially on the line 2—2 of Figure 1;

Figure 3 is a view in elevation of my improved shield unapplied;

Figure 4 is a view in top plan of the shield herein set forth;

Figure 5 is a sectional view taken substantially on the line 5—5 of Figure 3.

My improved shield as herein disclosed comprises a visor A formed of metal or other opaque material and which is formed in excess of a quadrant having its inner face 1 constituting a reflecting surface and having its outer face 2 preferably of a dull color, such as green.

The straight edges $a$ of the visor A converge inwardly and the extremities of said edges $a$ are provided with the outstanding wings 3 adapted, when the shield is in applied position, to have flat contact with the lens L of a headlight H, said wings 3 being arranged at an angle of approximately forty-five degrees with respect to the visor A. These wings 3 extend a slight distance beyond the periphery of the visor A and the lower parts of the extended portions of said wings 3 are continued by the tongues 4, extending in a direction inwardly of the visor and substantially coplanar with the wings 3. These extended portions of the wings 3 and tongues 4 are adapted to be engaged between the lens L and the rim R comprised in the door structure of the headlight whereby the shield is effectively maintained in applied position.

When in working position, the visor A is so positioned as to entirely overlie the lower left hand quadrant of the lens L and to partially overlie the upper left hand quadrant and the lower right hand quadrant of the lens with the central or apex portion of the visor disposed over the bulb B within the casing of the headlight.

With the shield so applied, the light beam emitted by the headlight will be confined to the driver's side of the road, assuring clear vision ahead and also a clear view of the side of the road to the right of the driver.

The inner reflecting surface 1 of the visor will also radiate back the light rays imposed thereon so that light will issue above and to one side of the shield in a more even beam.

From the foregoing description it is thought to be obvious that a headlight shield constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A headlight shield comprising a visor of opaque material formed in excess of a quadrant and having converging straight edges, the extremities of the straight edges having wings at an angle of approximately forty-five degrees with respect to the visor for contact with the lens of the headlight when the visor is in applied position, said wings extending beyond the periphery of the visor for engagement between the lens and rim of the door structure of a headlight, the extended portions of the wings having substantially coplanar tongues also adapted to be engaged between the lens and rim of the door structure of the headlight, the tongues of the wings being disposed in a direction inwardly of the visor.

In testimony whereof I hereunto affix my signature.

FRED W. GERKEN.